United States Patent [19]
du Plessis

[11] Patent Number: 5,109,884
[45] Date of Patent: May 5, 1992

[54] SAFETY VALVE ARRANGEMENT

[75] Inventor: Jacobus N. du Plessis, Krugersdorp, South Africa

[73] Assignee: Stanley Gordon, Transvaal, South Africa

[21] Appl. No.: 593,221

[22] Filed: Oct. 5, 1990

[30] Foreign Application Priority Data

Oct. 5, 1989 [ZA] South Africa .............. 89/7589

[51] Int. Cl.⁵ ............................................. F16K 17/32
[52] U.S. Cl. .................................... 137/460; 137/486
[58] Field of Search ............... 137/460, 486, 499, 504

[56] References Cited

U.S. PATENT DOCUMENTS

| | | | |
|---|---|---|---|
| 972,338 | 10/1910 | Collin | 137/460 |
| 1,280,477 | 10/1918 | Hopkins | 137/499 X |
| 1,466,412 | 8/1923 | Samain | 137/486 X |
| 3,171,432 | 3/1965 | Bard | 137/460 |
| 3,177,890 | 4/1965 | Rosenberg | 137/460 |
| 4,510,993 | 4/1985 | Luetzelschwab | 137/504 X |
| 4,724,866 | 2/1988 | Bates et al. | 137/504 X |
| 4,766,928 | 8/1988 | Golenstaneh | 137/504 |

FOREIGN PATENT DOCUMENTS

| | | |
|---|---|---|
| 1498294 | 1/1969 | Fed. Rep. of Germany ...... 137/460 |
| 201626 | 8/1923 | United Kingdom . |
| 310961 | 5/1929 | United Kingdom . |
| 1267310 | 7/1970 | United Kingdom . |

Primary Examiner—Stephen M. Hepperle
Attorney, Agent, or Firm—Cushman, Darby & Cushman

[57] ABSTRACT

This invention relates to a self-actuating safety valve arrangement, and includes a main valve housing having an inlet and an outlet for connection in a high pressure fluid line. A valve member is carried slidably within the main valve housing and is movable from an open position, in which it allows the passage of fluid through the fluid line, to a closed position. An auxiliary inlet port is formed in the housing and communicates with one end of a feedback line. The opposite end of the feedback communicates with an outlet port of a pilot valve, which is actuated by means of an orifice plate located in the fluid line downstream of the valve member. A lowering in pressure in the fluid line, generally caused by a downstream rupture or breakage, causes the orifice plate to close the pilot valve, which results in a drop in pressure in the feedback pipe. The main valve member is arranged to move to the closed position in response to the drop in pressure it experiences via the feedback pipe. The invention is intended to be used to render a flexible high pressure hose harmless in the event of it being severed, by shutting of the fluid supply thereto.

5 Claims, 2 Drawing Sheets

SAFETY VALVE ARRANGEMENT

BACKGROUND TO THE INVENTION

This invention relates to a safety valve arrangement.

Hydraulically or pneumatically operated machines may be powered via long lengths of flexible high pressure air or hydraulic hose. Flexible hose is used most often in cases where the machinery being operated is portable, such as a pneumatic drill.

Should the hose be severed, or burst loose from its connection on the machine, it may flail around wildly and in an extremely dangerous manner, energised by the high pressure air or water which is still flowing through it. In the past, serious injuries and even deaths have occurred as a result of a person being struck by such a length of hose.

UK Patent No. 2162979 (Edbro) is directed towards the avoidance of the uncontrolled fluid in the event of a rupture in the flow line. A downstream reduction in flow is sensed by means of an electro-hydraulic sensor. Electric power is used to shut off the hydraulic line. External power is thus required to power the sensor and to shut off the main shut-off valve.

European Patent No. 0039643 (Messier) discloses a valve for cutting off the fluid supply in the event of a sudden loss of downstream pressure in the hydraulic system of an aircraft. No downstream sensor is disclosed, and the operation of the valve relies on the relative tensions in a pair of springs which act in opposite directions.

It is an object of this invention to render a high pressure hose harmless in the event of it being severed, by providing a safety valve arrangement for shutting off the fluid supply thereto.

It is a further object of the invention to provide a safety valve arrangement which is sensitive to a downstream loss in pressure, yet which is also relatively rugged, and which does not require any external source of power for its operation.

SUMMARY OF THE INVENTION

According to the invention there is provided a self-actuating safety valve arrangement comprising a main valve housing having an inlet and an outlet for connection in a high pressure fluid line; a valve member carried slidably within the main valve housing and being movable from an open position, in which it allows the passage of fluid through the fluid line, to a closed position, in which it prevents the passage of fluid through the fluid line; an auxiliary inlet port formed in the housing and communicating in use with one end of a feedback line, and mechanical pressure sensing means communicating in use between the other end of the feedback line and a location in the fluid line downstream of the valve member, the pressure sensing means being arranged to sense a drop in pressure in the fluid line downstream of the valve member and to cause a drop in pressure in the feedback line in response thereto, and the main valve member being arranged to move to the closed position in response to the drop in pressure it experiences via the feedback line.

In a preferred form of the invention, the main valve housing, in conjunction with the valve member, defines a first chamber with which the auxiliary inlet port communicates, a second chamber is located between the inlet and the outlet, and the valve member includes an actuating piston having a first head, which is responsive to fluid pressure in the first chamber, a second head, which is responsive to fluid pressure in the second chamber, the first head having a surface area greater than the surface area of the second head, whereby substantially equal pressures in the first and second chambers will cause the valve member to open under the influence of the greater resultant force in the first chamber on the first head, and a loss of pressure in the first chamber via the auxiliary inlet port will cause the valve member to close under the influence of the greater resultant force in the second chamber on the second head.

Preferably, the main valve housing includes a valve seat located between the inlet and the outlet thereof, and the valve member includes a valve head movable from the closed position, in which it is seated in the valve seat, to the open position, in which it is displaced away from the valve seat, the valve head having a surface area less than that of the second head and being displaced away from the valve seat to the open position in the event of substantially equal pressures existing in the first and second chambers.

Conveniently, reset means are provided for holding the valve member open prior to it being held open by fluid pressure in the first chamber via the feedback pipe.

The reset means may include a fluid passage communicating between a location in the fluid line upstream of the valve member and the first chamber, and a manually operable reset valve which is operable to open the passage and simultaneously to close off the auxiliary inlet port so as to cause the pressures in the first and second chambers to be equalized.

In a preferred form of the invention, the sensing means comprises a pilot valve having an inlet port for communicating with the fluid line at a location downstream of the main valve housing, an outlet port for communicating with the other end of the feedback line, a pilot valve member movable from an open position, in which it allows the passage of return fluid along the feedback line, to a closed position, in which it prevents the passage of return fluid, and a pressure sensing and actuating device located in the fluid line for sensing a downstream drop in pressure and for moving the valve member from the open to the closed position in response thereto.

The pressure sensing and actuating device preferably comprises an orifice plate located within the fluid line, and a mechanical linkage interconnecting the orifice plate and the pilot valve member, the orifice plate being configured to be urged downstream in response to a predetermined difference in pressure existing across the orifice plate.

The pilot valve member conveniently has a first bore formed therein which is arranged to allow the feedback line to communicate with the fluid line in the event of the pilot valve member being in the open position, and a second bore formed therein which is arranged to allow the feedback line and first chamber to vent to atmosphere in the event of the pilot valve member being in the closed position.

Locking means may be provided to lock the pilot valve member in the closed position, the locking means being in the form of a spring-actuated plunger which locates in a recess in the pilot valve member once the pilot valve member has moved to the closed position.

Conveniently, the pilot valve member is spring-biased in the open position by means of a spring, the pressure sensing and actuating device acting against the spring in response to a downstream lowering in pressure.

The feedback line may be in the form of an exposed feedback pipe. Alternatively, the feedback line may be in the form of a passage formed in the main valve housing, in which case the main valve housing accommodates the pilot valve.

The fluid line may be a high pressure pneumatic line for operating pneumatically-driven equipment, and the loss of pressure in the line is caused by a downstream break or rupture in a flexible air hose which forms part of the fluid line.

DESCRIPTION OF EMBODIMENTS

Figure 1:
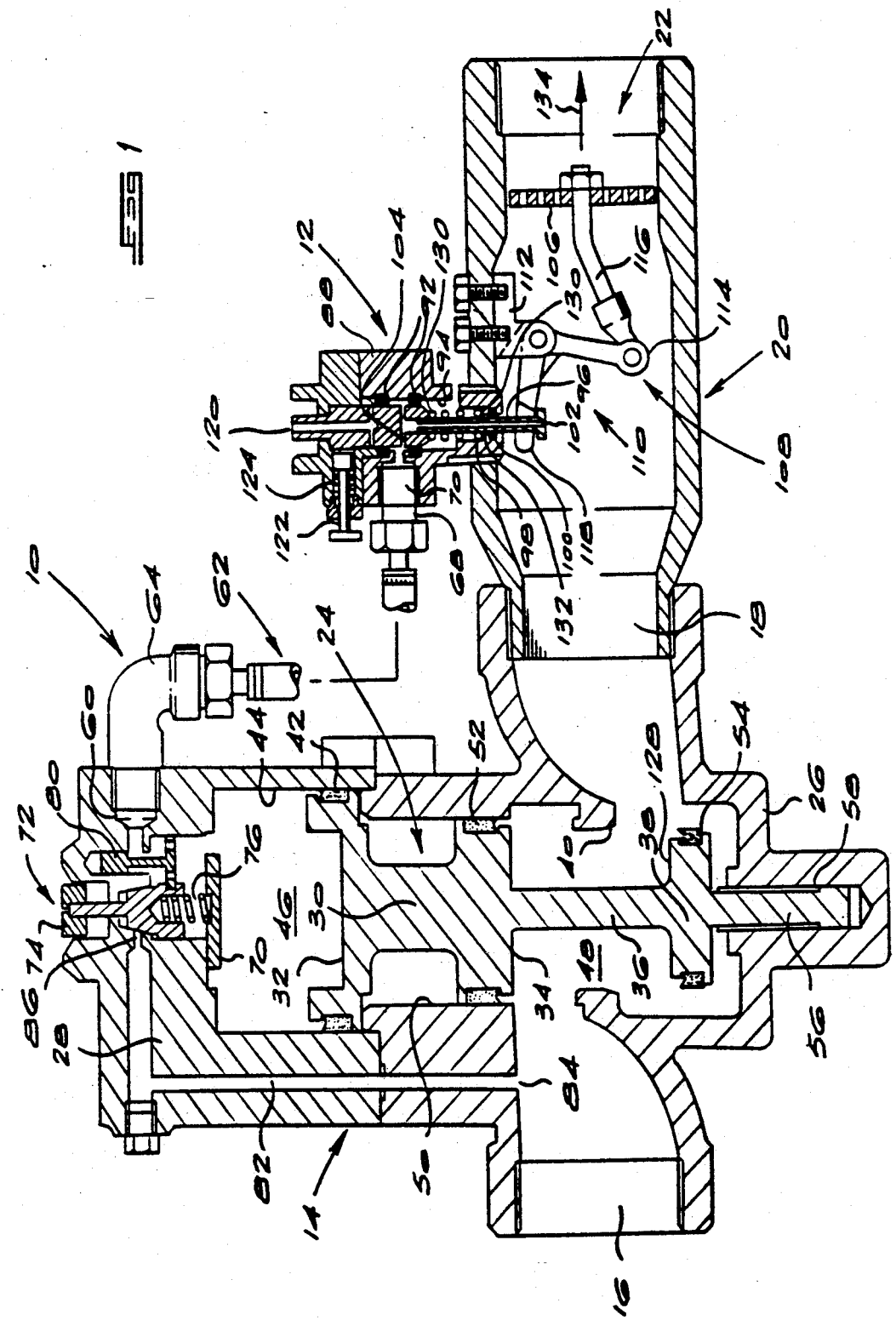
FIG. 1 shows a cross-sectional side view of a valve arrangement of the invention in the open position.
Figure 2:
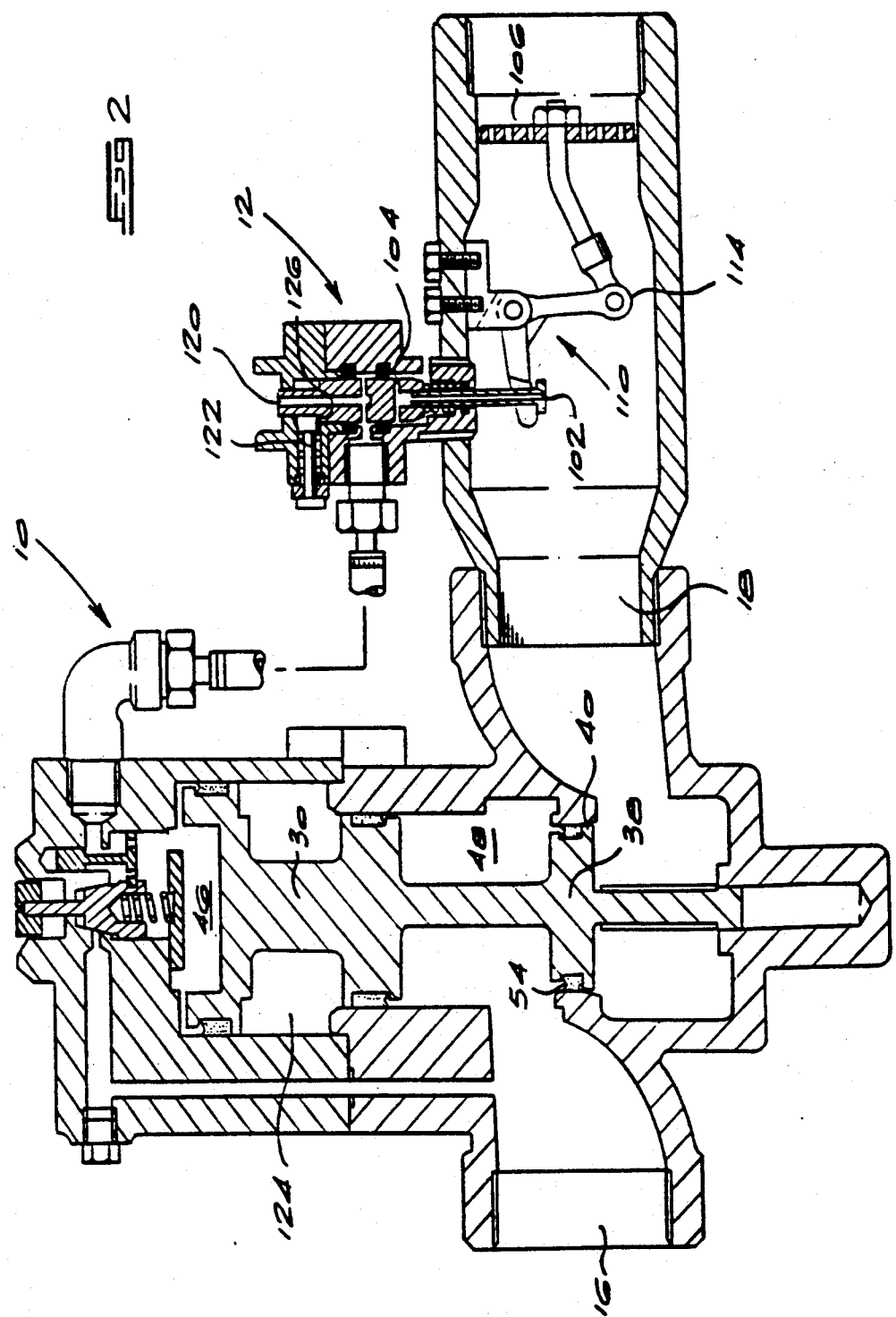
FIG. 2 shows a cross-sectional side view of a valve arrangement of the invention in the closed position.

The valve arrangement illustrated in FIGS. 1 and 2 comprises a main shuttle valve 10 and a pilot valve 12 which are in use installed alongside one another in a high pressure air line. The main valve 10 has a valve housing 14 which is provided with an inlet 16 for connection to a conventional manually-operated control valve (not shown) and an outlet 18 which is coupled to a short rigid length of piping 20 to which the pilot valve 12 is mounted. The piping 20 has an outlet 22 which is connected in use to a flexible high-pressure air hose which leads to some form of pneumatically-powered equipment, such as a pneumatic drill.

The valve housing 14 accommodates a valve member 24 which is able to slide vertically up and down within the housing 14 from an open position, illustrated in FIG. 1, to a closed position illustrated in FIG. 2.

The valve housing 14 is cast from two components, a valve body 26 and a cover 28 which is bolted firmly to the body 26. The valve member 24 includes an actuating piston 30 having a first or upper head 32 and a second, or lower head 34, which has a smaller surface area than that of the upper head 32. A valve stem 36 extends downwardly from the actuating piston 30 and carries a valve head 38 which seats in a valve seat 40 formed in the body 26 when the member is in the closed position, as can be seen in FIG. 2. The upper head 32 is fitted with a piston ring 42 which provides a snug sliding seal with a cylindrical inner wall 44 formed in the cover 28. The cylindrical wall 44 and upper piston head 32 define a first, or upper chamber 46.

A second, or lower chamber 48 exists between the inlet and the outlet 16 and 18 of the main valve housing, the lower piston head 34 and the valve head 38. The lower head 34 slides up and down within a cylindrical wall 50 formed in the upper end of the valve body 26, the piston ring 52 providing a snug sliding seal. A similar piston, or sealing ring 54 is mounted around the valve head 38 to ensure that the valve head 38 forms an efficient seal with the valve seat 40. The valve stem 26 has a lower portion 56 which slides up and down within a blind bore 38 formed in the valve body 26.

An auxiliary inlet port 60, which communicates with the upper chamber 46, is formed in the head of the housing cover 28. A feedback pipe has one end fitted with a threaded connector 64 which is screwed into the inlet port 60. The opposite end of the feedback pipe 62 is provided with a threaded connector 68 which is screwed into an outlet port 70 which is formed in the pilot valve 12.

A manually operable reset valve 72 is mounted in the head of the cover 28, and comprises a push-button 74, a return spring 76 which acts between a spring seat 78 and the push button 74, and a slave valve 80. A passage 82 is formed in the valve housing 14, having an inlet 84 located upstream of the member valve 24 and an outlet 86 which communicates with the upper chamber 46 when the push-button 74 of the reset valve 72 is depressed.

The pilot valve 12 has a valve housing 88 which accommodates a valve member 90 which is able to slide vertically up and down on sealing rings 92 mounted within a cylindrical chamber 94 formed in the housing 88. The valve member 90 has a downwardly depending valve stem 96 which extends through a cylindrical hole 98 formed in the valve housing 90. An O-ring 100 provides an air-tight seal between the valve stem 96 and the housing 98. A lower axial bore 102 extends through the valve stem 96, and communicates with a radial passage 104 formed in the valve member 96, which communicates in turn with the outlet port 70.

The valve stem 96 is actuated by means of an orifice plate 106 which is located in the pipe 20 and which is linked to the valve stem 96 via a linkage 108. The linkage 108 includes a cranked arm 10 which is mounted pivotably at its elbow by means of a mounting block 112 to the inner wall of the pipe, and which has one end 114 mounted pivotably to the orifice plate 106 via an extension arm 116 and an opposite end co-operating with the valve stem 96.

The valve member 90 is also provided with an upper axial bore 120 which vents to atmosphere and which communicates with the inlet port 70 when the valve stem 96 is pulled downwards. A plunger 122, which is actuated by means of a spring 124, abuts against a shoulder 126 formed in the valve member to retain the valve member in the lowered position, as is shown in FIG. 2.

In use, the valve arrangement operates as follows. Once the manually operated control valve located at the inlet end 16 of the valve housing is opened, the resultant initial pressure in the chamber 48 forces the valve member 24 upwards to the position indicated in FIG. 2. As the surface area of the piston head 34 is greater than that of the upper face of the valve head 38, the total upward force exerted by the air pressure on the lower piston head 34 will cause the valve member 24 to be maintained in the closed position. This condition will only arise if the upward force on the piston head 34 is greater than both the downward force on the upper face 128 of the valve head 38 and the downward force of gravity.

When the valve member 24 is in the closed position, no pressurised air will be fed back into the upper chamber 46 via the lower bore 102 and the feedback pipe 62. In order to pressurise the first chamber 46, the push-button 74 is depressed, causing the manual reset valve to move downwards and thereby allowing pressurised air to flow along the passage 82 into the upper chamber 46. As the air pressures in the upper and lower chambers 46 and 48 are now equalised, the valve member 24 will move downwards into the open position, as is shown in FIG. 1, as a result of the greater net force exerted on the upper piston head 32. The high pressure air will then flow downstream through the orifice plate 106 in the pipe 20 via the air hose to the pneumatic machinery being used. The orifice plate is configured so that 80% of its surface area is made up of orifices. In other words, it results in a 20% reduction in the volume of air which is able to pass through the orifice plate in the fluid line. It has been calculated that the resultant 20% reduction in volume is insignificant as regards the powering of the pneumatic equipment. However, the product of the pressure differential across the orifice plate 106 and the surface area of the orifice plate results in a sufficient net force to move the orifice plate 106 in the direction of arrow 134 in the event of free flow situation existing downstream of the orifice plate, caused by the air hose being severed or disconnected.

A return spring 130 acts between the valve stem 96 and a seat 132 formed in the pilot valve housing 88 ensures that the orifice plate 106 is not thrust forward by the initial minor pressure differential which may exist across the orifice plate on start-up, or by a minor leakage or rupture in the air hose downstream of the orifice plate 106.

On start-up, as the reset valve 72 is depressed, an upper piston of the slave valve 80 obturates the return flow of air into the inlet port 60 so as to allow the build up of pressure in the feedback pipe 62. The manual reset valve 74 is released after a few seconds, thereby blocking off the passage 82, and at the same time allowing pressurised air to enter the upper chamber 46 via the feedback pipe 62. As a result, the valve member 24 is maintained in the open position for as long as the air pressure in the upper chamber 46 is substantially the same as that in the lower chamber 48, which will always be the case under normal operating conditions where the pilot valve 12 is open.

In the event of there being a pressure drop across the orifice plate 106 caused by a substantial loss in pressure downstream of the orifice plate 106, the orifice plate will move in the direction of arrow 134 to the position indicated in FIG. 2. This loss in pressure is usually the result of the feedback hose being badly ruptured, being completely severed or bursting loose from its inlet attachment at the pneumatic machinery.

As can clearly be seen in FIG. 2, the forward movement of the orifice plate 106 will be transmitted via the linkage 110 to urge the valve stem 96 and valve member 90 downwards. This in turn will cause the return supply of pressurised air to be cut off by isolating the lower bore 102 and radial passage 104 from the feedback pipe 62. The valve member 90 is locked in the downward position by the spring-actuated plunger 122 co-operating with the shoulder 126. In this position, the outlet port 70 of the pilot valve communicates directly with the atmosphere via the upper bore 120, causing any pressurised air which may remain in the feedback pipe 62 or in the upper chamber 46 of the main valve to vent to atmosphere through the upper bore 120.

The resultant depressurisation of the upper chamber 46 will cause the valve member 24 to move upwardly to the closed position, as is shown in FIG. 2, the valve head 38 immediately shutting off the supply of high pressure air along the high pressure line to the air hose. This will prevent the air hose from flailing around wildly under the influence of high pressure air, as the supply of high pressure air is cut off almost instantaneously.

In order to reset the valve arrangement of the invention to the open position indicated in FIG. 1, the spring-actuated plunger 122 is retracted and the reset valve 72 is depressed to allow the main valve member 24 to move downwardly, as has been described earlier on in the specification. The valve arrangement can only be reset if the free end of the air hose downstream of the orifice plate 106 is connected to the pneumatic machinery. If the free end of the air hose is left open, the pressure differential established across the orifice plate will immediately cause the orifice plate to be urged forward. Therefore, even on start-up, if the end of the air hose is accidentally disconnected, the valve arrangement will shut off the high pressure air supply, thereby preventing air from flowing freely under pressure from the free end of the air hose.

The safety valve arrangement of the invention is intended for use in harsh environments, such as in underground mines, where secondary sensing equipment, such as electro-pneumatic valves, would have a short lifespan.

The valve arrangement of the invention has the advantage that it is self-actuating, and therefore not reliant on any external source of power for its operation.

I claim:

1. A self-actuating safety valve arrangement comprising:
   a) a main valve housing having an inlet and an outlet for connection in a high pressure fluid line;
   b) a main valve member carried slidably within the main valve housing, and being movable between an open position in which it allows the passage of fluid through the fluid line, and a closed position in which it prevents the passage of fluid through the fluid line;
   c) a first chamber being defined between one side of the main valve member and the main valve housing;
   d) a second chamber being defined between an opposite side of the main valve member, the inlet and the outlet of the main valve housing;
   e) a feedback line communicating in use between the first chamber and a location in the fluid line downstream of the main valve member, the main valve member being arranged to be held open by fluid pressure via the feedback line, and to move to the closed position in response to a drop in pressure in the first chamber via the feedback line,
   f) mechanical pressure sensing means being arranged to sense a drop in pressure in the fluid line downstream of the main valve member and to cause a drop in pressure in the feedback line in response thereto;
   g) reset means for holding the main valve member open prior to it being held upon by fluid pressure via the feedback line, the reset means including a passage communicating in use between the first chamber and a location in the fluid line upstream of the main valve member, and a reset valve for selectively opening the passage.

2. A valve arrangement as claimed in claim 1 in which the reset valve is movable between a first position, in which it simultaneously opens the passage and closes the feedback line, and a second position, in which it simultaneously closes the passage and opens the feedback line.

3. A valve arrangement as claimed in claim 1 in which the mechanical pressure sensing means comprises a pilot valve having an inlet port for communicating with the fluid line at a location downstream of the main valve member, an outlet port for communicating with the other end of the feedback line, a pilot valve member movable from an open position, in which it allows the passage of return fluid along the feedback line, to a closed position, in which it prevents the passage of return fluid, a pressure sensing and actuating device located in the fluid line for sensing a downstream lowering in pressure and for moving the pilot valve member from the open to the closed position in response thereto, and locking means for locking the pilot valve member in the closed position.

4. A valve arrangement as claimed in claim 3 in which the locking means is in the form of a manually resettable spring-actuated plunger which locates in a recess in the pilot valve member in the event of the pilot valve member moving to the closed position.

5. A valve arrangement as claimed in claim 3 in which the pilot valve member is spring-biased in the open position, and the pressure sensing and actuating device is arranged to act against the spring in response to a downstream lowering in pressure of a predetermined magnitude.

* * * * *